United States Patent
Shen et al.

(10) Patent No.: US 10,220,805 B2
(45) Date of Patent: Mar. 5, 2019

(54) RADIATOR GRILLE ATTACHMENT

(71) Applicant: Toyota Motor Engineering & Manufacturing North America, Inc., Erlanger, KY (US)

(72) Inventors: Mingher Fred Shen, Ann Arbor, MI (US); Brandon W. Letcher, Ypsilanti, MI (US); Brandon H. Hanna, Medicine Hat (CA); Lenny D. Gotwalt, Greenville, MI (US); Chad B. Pierce, Portland, MI (US); Robert D. Gray, Wyoming, MI (US); Timothy B. Dutton, Grand Rapids, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 29 days.

(21) Appl. No.: 15/664,744

(22) Filed: Jul. 31, 2017

(65) Prior Publication Data
US 2019/0031129 A1    Jan. 31, 2019

(51) Int. Cl.
*B60K 11/04* (2006.01)
*B60R 19/52* (2006.01)
*B60K 11/08* (2006.01)
*B60K 11/02* (2006.01)

(52) U.S. Cl.
CPC .............. *B60R 19/52* (2013.01); *B60K 11/02* (2013.01); *B60K 11/08* (2013.01); *B60R 2019/525* (2013.01)

(58) Field of Classification Search
CPC ....... B60K 11/04; B60K 11/085; B60K 11/08; B60R 13/0206; B60R 19/52; B60R 21/34
See application file for complete search history.

(56) References Cited

U.S. PATENT DOCUMENTS

| 4,406,489 | A  |   | 9/1983 | Trabert |             |
|-----------|----|---|--------|---------|-------------|
| 4,579,184 | A  | * | 4/1986 | Hiramoto | B60K 11/04 |
|           |    |   |        |         | 165/67      |
| 6,386,624 | B1 |   | 5/2002 | Schultz et al. |      |
| 6,675,921 | B2 | * | 1/2004 | Brown   | B60K 11/04  |
|           |    |   |        |         | 165/67      |
| 6,880,655 | B2 | * | 4/2005 | Suwa    | B60K 11/08  |
|           |    |   |        |         | 180/68.1    |

(Continued)

FOREIGN PATENT DOCUMENTS

EP    1561647 A1    8/2005

*Primary Examiner* — Hau V Phan
(74) *Attorney, Agent, or Firm* — Christopher G. Darrow; Darrow Mustafa PC

(57) ABSTRACT

An attachment member may couple a radiator to a grille of an automotive vehicle. The attachment member may be easily fit into a complementary grille opening on the grille. The complementary shapes of the attachment member and the grille opening may limit movement of the attachment member relative to the grille in one or more directions. The attachment member may install from above the grille opening or horizontally slide into the grille opening. Engagement features on the attachment member may engage with surfaces of the grille opening to limit relative vertical movement. The attachment member may provide a first engagement with the grille at a first level and a second engagement with the radiator at a second level different than the first level.

20 Claims, 8 Drawing Sheets

(56) References Cited

U.S. PATENT DOCUMENTS

| | | | | |
|---|---|---|---|---|
| 6,998,174 | B2* | 2/2006 | Porter | B29C 45/1642 |
| | | | | 293/120 |
| 7,036,617 | B2* | 5/2006 | Harada | B60K 11/04 |
| | | | | 180/68.4 |
| 7,108,092 | B2* | 9/2006 | Suwa | B60K 11/04 |
| | | | | 180/68.4 |
| 7,758,106 | B2 | 7/2010 | Glickman et al. | |
| 8,051,933 | B2* | 11/2011 | Hwang | B60K 11/04 |
| | | | | 180/68.4 |
| 8,615,962 | B1* | 12/2013 | Perez | B60R 13/0206 |
| | | | | 24/292 |
| 8,763,738 | B2* | 7/2014 | Missig | B62D 25/084 |
| | | | | 180/68.1 |
| 2001/0001994 | A1* | 5/2001 | Enomoto | B60K 11/04 |
| | | | | 180/68.4 |
| 2005/0230162 | A1* | 10/2005 | Murayama | B60K 11/08 |
| | | | | 180/68.1 |
| 2006/0237998 | A1* | 10/2006 | Andre | B60R 21/34 |
| | | | | 296/193.11 |
| 2007/0062671 | A1* | 3/2007 | Sugimoto | F28D 1/0452 |
| | | | | 165/67 |
| 2012/0227239 | A1* | 9/2012 | Itoh | B60K 11/04 |
| | | | | 29/428 |
| 2013/0278001 | A1* | 10/2013 | Zimmerman | B60R 13/0206 |
| | | | | 296/1.08 |
| 2014/0291056 | A1* | 10/2014 | Takanaga | B60K 11/085 |
| | | | | 180/274 |
| 2016/0368442 | A1* | 12/2016 | Dubey | B60R 19/52 |

\* cited by examiner

RADIATOR GRILLE ATTACHMENT

FIELD

The subject matter described herein relates in general to vehicles and, more particularly, to radiator grille attachments used in vehicles.

BACKGROUND

Modern vehicles commonly have a variety of components attached together. The methods utilized to attach these components together may vary. Attachment methods that are expensive to manufacture increase vehicle cost. Additionally, attachment methods that are time consuming to install increase assembly time and vehicle cost. Thus, it would be desirable to provide attachment methods that are of low cost and/or easy to assemble.

SUMMARY

An attachment member may couple a radiator to a grille of an automotive vehicle. The attachment member may be easily fit into a complementary grille opening on the grille. The complementary shapes of the attachment member and the grille opening may limit movement of the attachment member relative to the grille in one or more directions. The attachment member may install from above the grille opening or horizontally slide into the grille opening. Engagement features on the attachment member may engage with surfaces of the grille opening to limit relative vertical movement. The attachment member may provide a first engagement with the grille at a first level and a second engagement with the radiator at a second level different than the first level.

In one respect, the present disclosure is directed to a system for attaching a grille to a radiator in an automotive vehicle. The system includes a grille, a radiator and an attachment member. The grille has a grille opening along an edge thereof. The grille opening has a first profile or, in other words, a first shape. The radiator is disposed behind at least a portion of the grille. The attachment member has an exterior second profile or, in other words, an exterior second shape. The second shape is generally complementary to the first shape such that the attachment member is adapted for disposition within the grille opening with the second shape in close proximity to the first shape. The attachment member has a first attachment to the grille at a first level and a second attachment to the radiator at a second level. The first level is spaced apart from the second level. The first and second attachments are adapted to couple the radiator to the grille through the attachment member.

In another respect, the present disclosure is directed to a system for attaching a grille to a radiator in an automotive vehicle. The system includes a grille, a radiator and an attachment member coupling the radiator to the grille. The grille has a grille opening along an edge thereof. The grille opening has a first profile or, in other words, a first shape. The radiator is disposed behind at least a portion of the grille. The attachment member has an exterior second profile or, in other words, an exterior second shape. The second shape is generally complementary to the first shape such that the attachment member is adapted for disposition within the grille opening with the second shape in close proximity to the first shape. The attachment member is adapted to couple the radiator to the grille, and insertable into the grille opening from above.

In another respect, the present disclosure is directed to a system for attaching a grille to a radiator in an automotive vehicle. The system includes a grille, a radiator and an attachment member coupling the radiator to the grille. The grille has a grille opening along an edge thereof. The grille opening has a first profile or, in other words, a first shape. The radiator is disposed behind at least a portion of the grille. The attachment member has an exterior second profile or, in other words, an exterior second shape. The second shape is generally complementary to the first shape such that the attachment member is adapted for disposition within the grille opening with the second shape in close proximity to the first shape. The first and second attachments are adapted to couple the radiator to the grille through the attachment member. The attachment member is insertable into the grille opening by sliding the attachment member into the grille opening.

DETAILED DESCRIPTION

Figure 1:
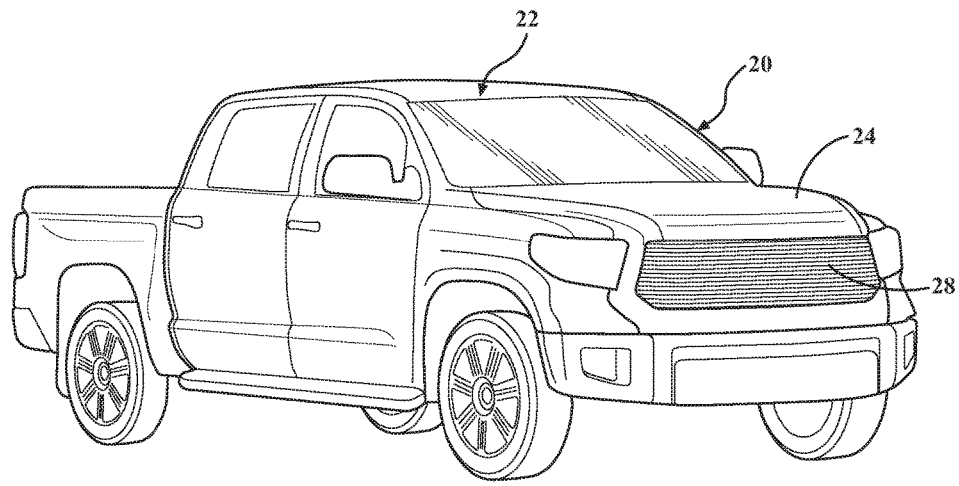
FIG. 1 is a perspective view of a vehicle which may use an exemplary cup-shaped attachment member to attach a radiator to a grille.

This detailed description relates to an attachment member that may couple a radiator to the grille of an automotive vehicle. The attachment member may be easily fit into a complementary grille opening on the grille. The complementary shapes of the attachment member and grille opening may limit movement of the attachment member relative to the grille in one or more directions. The attachment member may install from above the grille opening or horizontally slide into the grille opening. Engagement features on the attachment member may engage with surfaces of the grille opening to limit relative vertical movement. The attachment member may provide a first engagement with the grille at a first level and a second engagement with the radiator at a second level different than the first level.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the Figures, but the embodiments are not limited to the illustrated structure or application.

It will be appreciated that for simplicity and clarity of illustration, where appropriate, reference numerals have been repeated among the different Figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
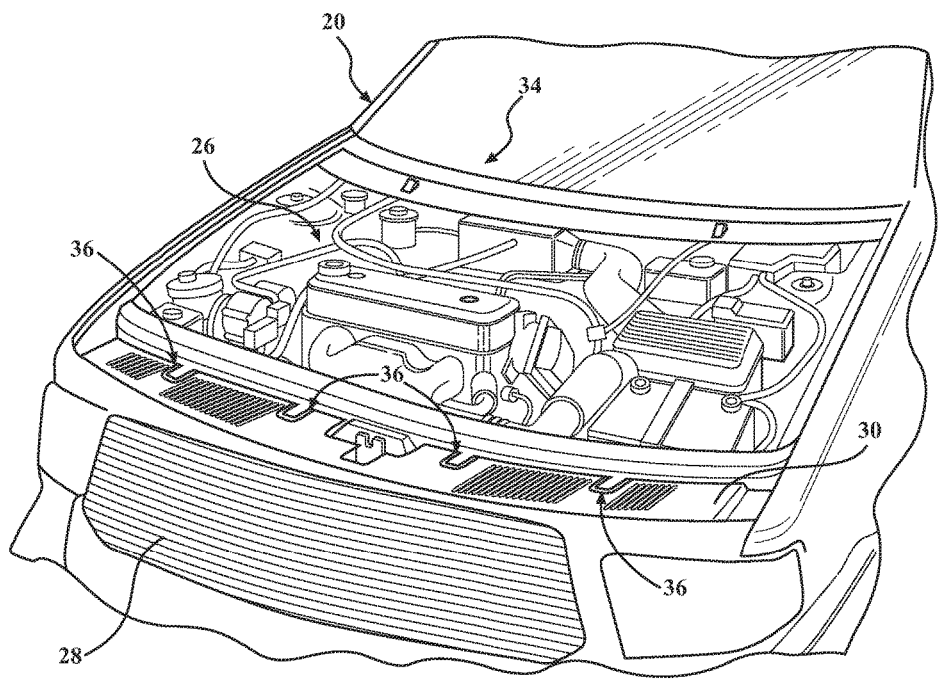
FIG. 2 is a fragmented view of the vehicle of FIG. 1 with the hood removed.

Referring to FIGS. 1 and 2, an example of a vehicle 20 is shown. As used herein, "vehicle" means any form of motorized transport. In one or more implementations, the vehicle 20 can be an automobile or truck. While arrangements will be described herein with respect to automobiles, it will be understood that embodiments are not limited to automobiles. In some implementations, the vehicle 20 may be a watercraft, an aircraft, a train, a space craft or any other form of motorized transport.

Figure 13:
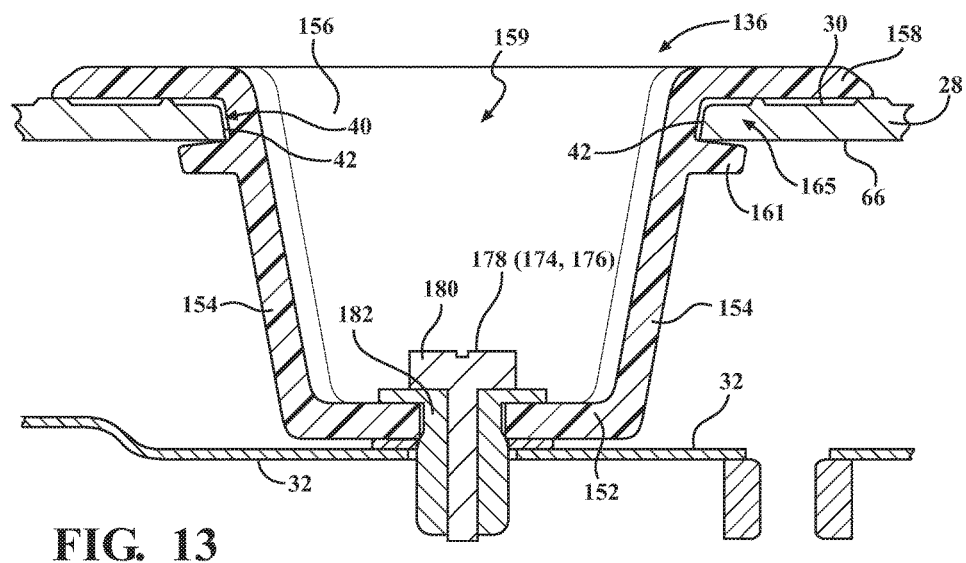
FIG. 13 is a cross-sectional view along line 13-13 of FIG. 11 illustrating the second exemplary attachment member installed in a grille and attached to a radiator.

The vehicle 20 may define an exterior 22 and may have a hood 24 that encloses a portion of an engine bay 26. A grille 28 may be in front of the engine bay 26 and allow air to flow into the engine bay 26. The grille 28 may attach to the vehicle 20 in any well-known way, such as by fasteners. The grille 28 may have a top surface 30. A radiator 32 (see FIGS. 9, 13 and 15) may be disposed between the grille 28 and an engine 34 in the engine bay 26 such that air flowing through the grille 28 may also flow through the radiator 32. The radiator 32 may be attached to the grille 28 with one or more attachment members 36. The attachment members 36 may be generally—cup-shaped, and have a side opening 38. The attachment members 36 may engage with the top surface 30.

Figure 3:
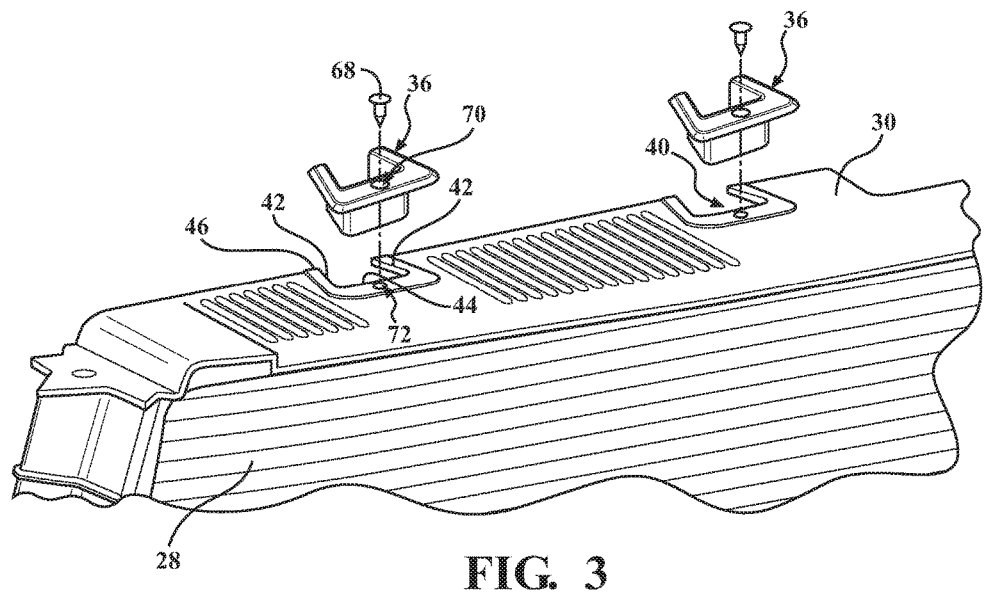
FIG. 3 is a fragmented assembly view of a first example of an attachment member to attach a radiator to a grille.
Figure 4:
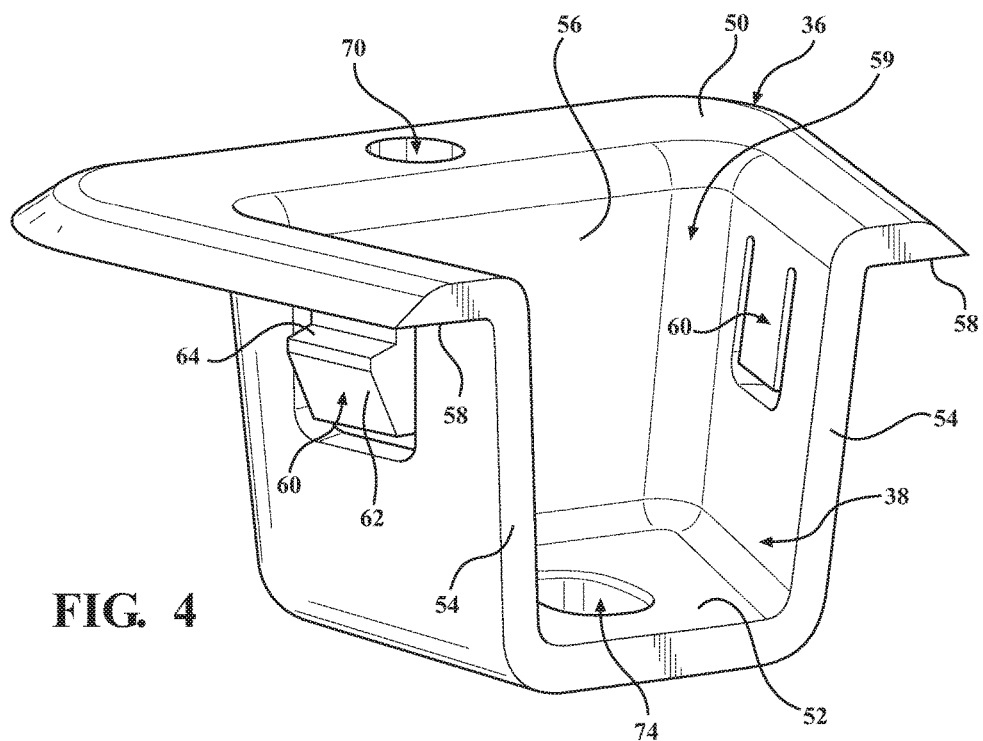
FIGS. 4-6 are perspective, top plan, and front plan views, respectively, of the first exemplary attachment member.
Figure 5:
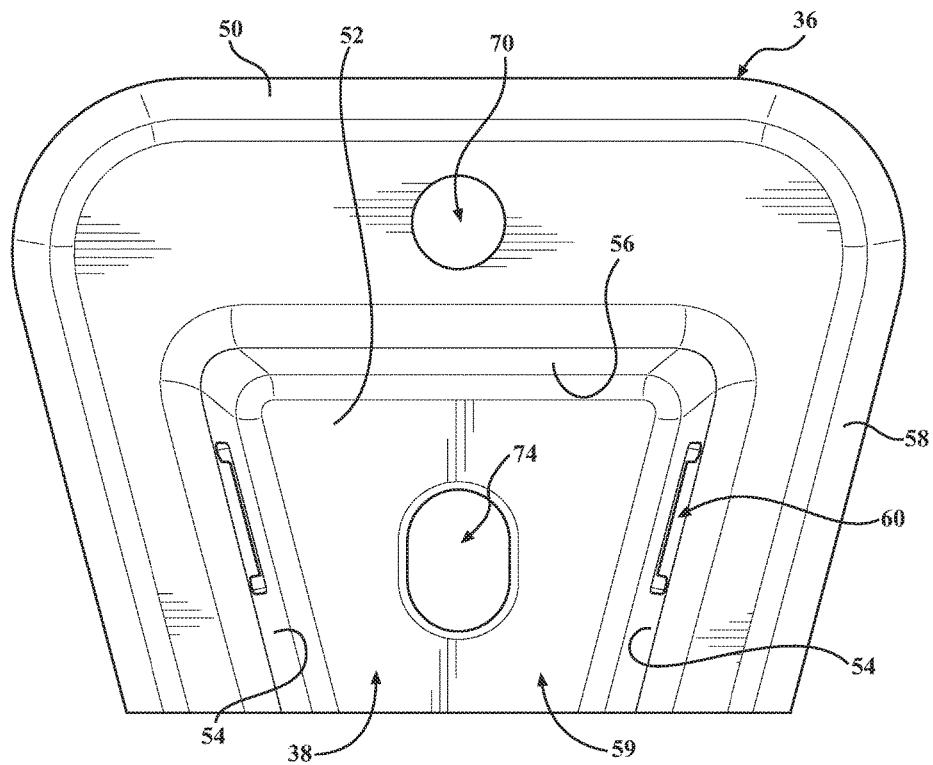
Figure 6:
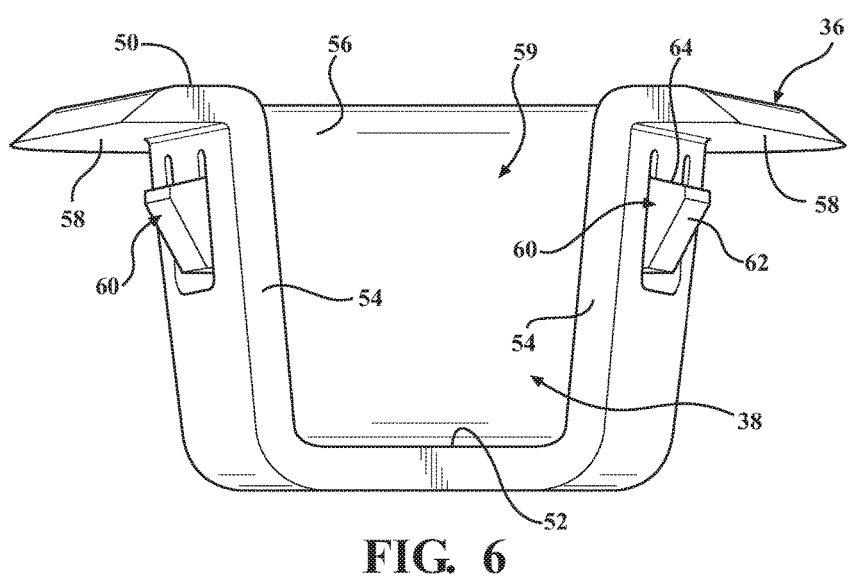
Figure 7:
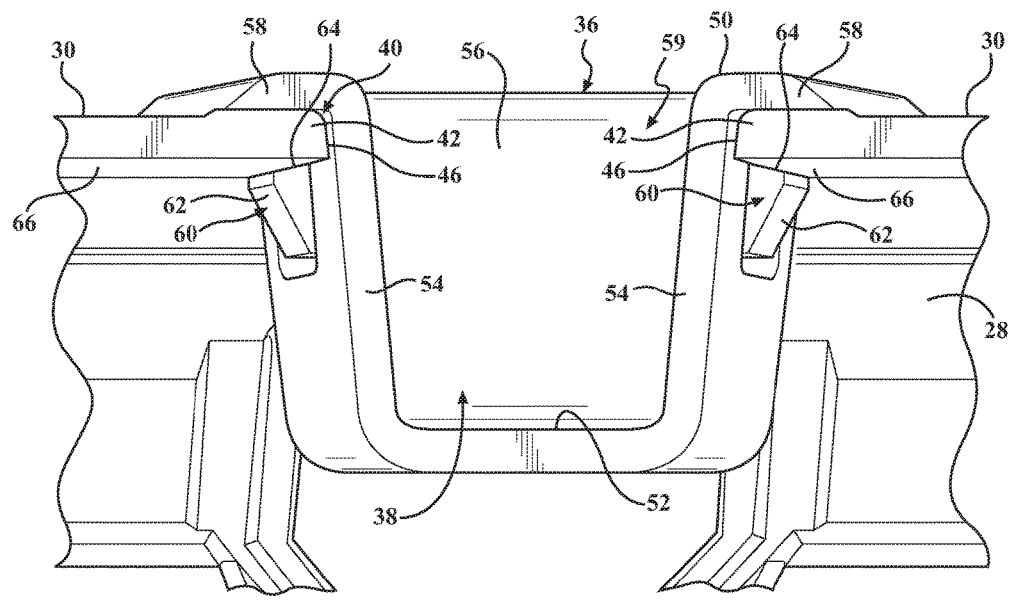
FIGS. 7-8 are front plan and perspective views, respectively, of the first exemplary attachment member installed in a grille.
Figure 8:
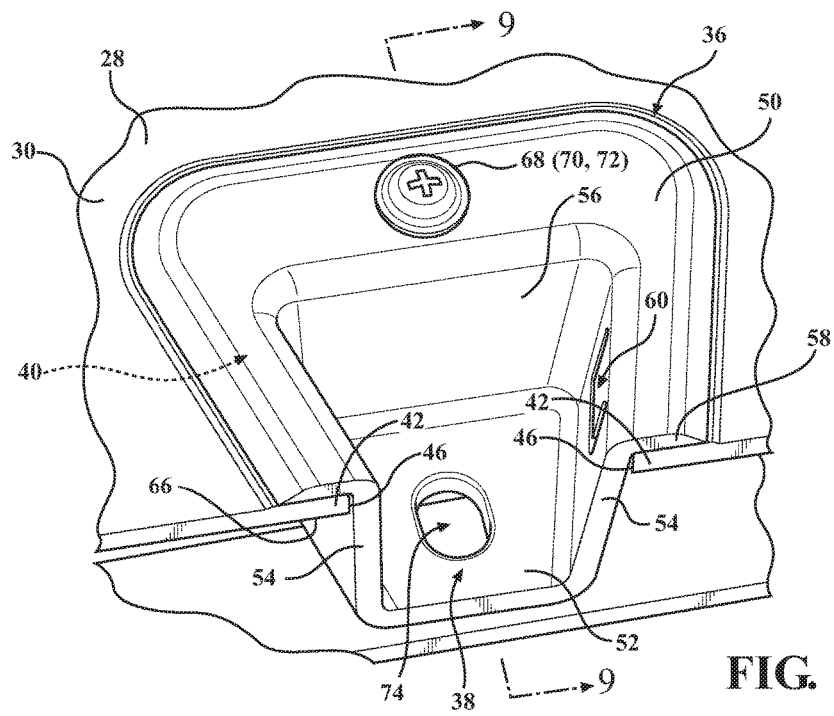

Referring additionally to FIG. 3, in one or more arrangements, an attachment member 36 may be attached to the grille 28 by inserting the attachment member 36 into a recess, or grille opening 40, in the top surface 30, such as shown in FIG. 3, by way of example. The grille opening 40 may be generally U-shaped. In one or more arrangements, the grille opening 40 is generally U-shaped, with a pair of sides 42 extending from a base side 44. In one or more arrangements, the sides 42 may be generally parallel to one another as they extend from the base side 44 toward their ends 46, while in other arrangements, the sides 42 may taper toward one another as they extend from the base side 44 toward their ends 46, such as the arrangement shown in FIG. 3.

In one or more arrangements, an attachment member 36 has a shape that may be complementary to that of the grille opening 40. Referring to FIGS. 3-9, a first exemplary attachment member 36 is shown which is configured to engage with a grille opening 40 having tapering sides 42. The attachment member 36 may have an upper surface 50 and a lower surface 52 spaced apart by three side walls. The three sidewalls may include a pair of tapering side walls 54 and a base side wall 56. The upper surface 50 extends outwardly beyond the side walls 54, 56 to form a flange 58. The side walls 54, 56 may be dimensioned to fit within the grille opening 40 such that the attachment member 36 may be inserted into the grille opening 40 from above, with the flange 58 ultimately resting on the top surface 30. The flange 58 thereby limits the degree to which the attachment member 36 may be inserted into the grille opening 40. The flange 58 may provide vertical support for the attachment member 36 and a radiator 32 attached thereto. The upper and lower surfaces 50, 52, in conjunction with the side walls 54, 56, may form a generally cup-shaped attachment member 36 with an open top and the side opening 38, allowing access to an interior 59 of the attachment member 36.

In one or more arrangements, one or more of the tapering side walls 54 may include a resilient clip 60 with a ramped surface 62 and a locking flange 64. The ramped surface 62 forms a leading edge that engages with the top surface 30 as the attachment member 36 is inserted into the grille opening 40, while, after installation, the locking flange 64 engages with a bottom side 66 of the top surface 30. The resilient characteristic of the clip 60 allows the clip 60 to flex during insertion and return toward its nominal state after the attachment member 36 is seated in the grille opening 40. Engagement of the locking flange 64 with the bottom side 66 inhibits vertical removal of the attachment member 36 from the grille opening 40. In this manner, the locking flange 64 and the flange 58 may vertically retain the attachment member 36 within the opening 40. The shape of the attachment member 36 relative to that of the grille opening 40 may limit both fore and aft (longitudinal) and lateral (cross-vehicle) movement relative to the vehicle 20. The tapering side walls 54 may engage with the tapering sides 42 of the grille opening 40 to limit both lateral movement and movement toward the ends 46, while the base side wall 56 may engage with the base side 44 to limit movement toward the base side 44. In this manner, the attachment member 36 may be retained within the grille opening 40.

In one or more arrangements, a fastener 68 may be utilized to retain the attachment member 36 within the grille opening 40. For example, the attachment member 36 may have an opening 70 in the upper surface 50, which may align with an opening 72 in the top surface 30. The fastener 68 may be inserted into the aligned openings 70, 72 to retain the attachment member 36 in the grille opening 40. The fastener 68 may function to limit both vertical and fore and aft movement of the attachment member 36 relative to the grille opening 40. In one or more arrangements, the fastener 68 may be used in conjunction with tapering features and/or clip and flange features to provide additional retention. The fastener 68 may take a variety of forms. By way of non-limiting example, the fastener 68 may be a threaded fastener, a push clip and grommet, etc.

Figure 9:
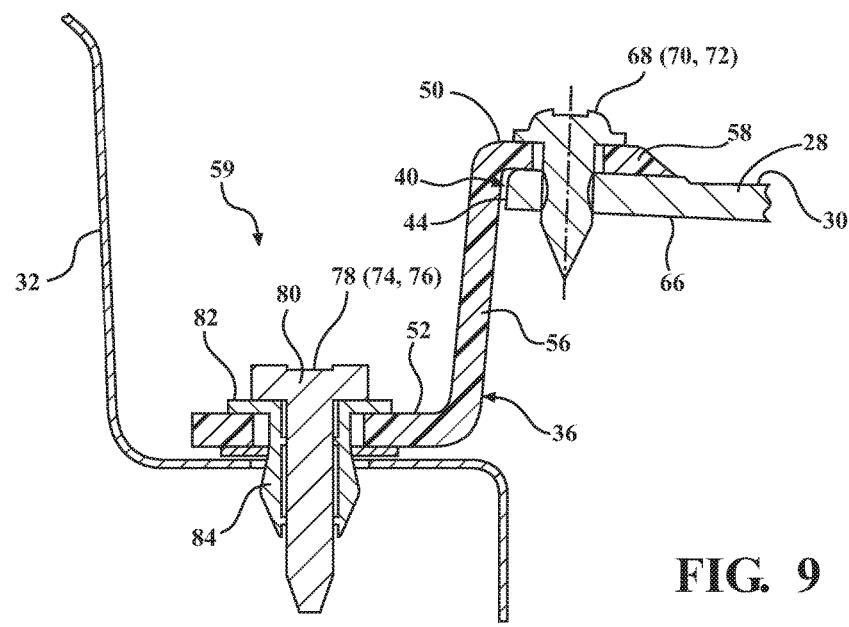
FIG. 9 is a cross-sectional view along line 9-9 of FIG. 8 illustrating the first exemplary attachment member installed in the grille and attached to a radiator.
Figure 10:
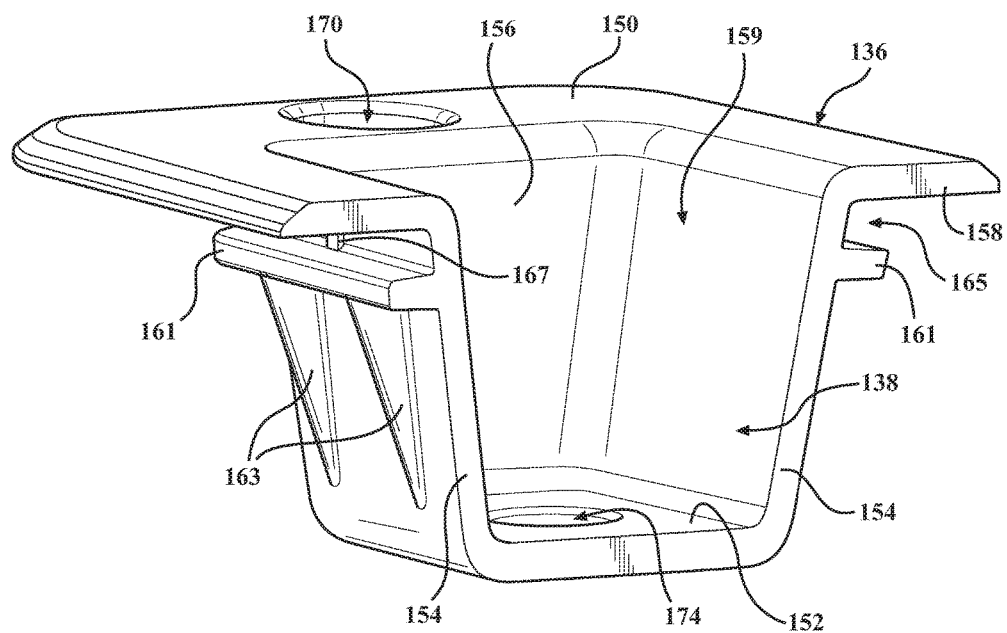
FIGS. 10-12 are perspective, top plan, and rear plan views, respectively, of a second exemplary cup-shaped attachment member to attach a radiator to a grille.
Figure 11:
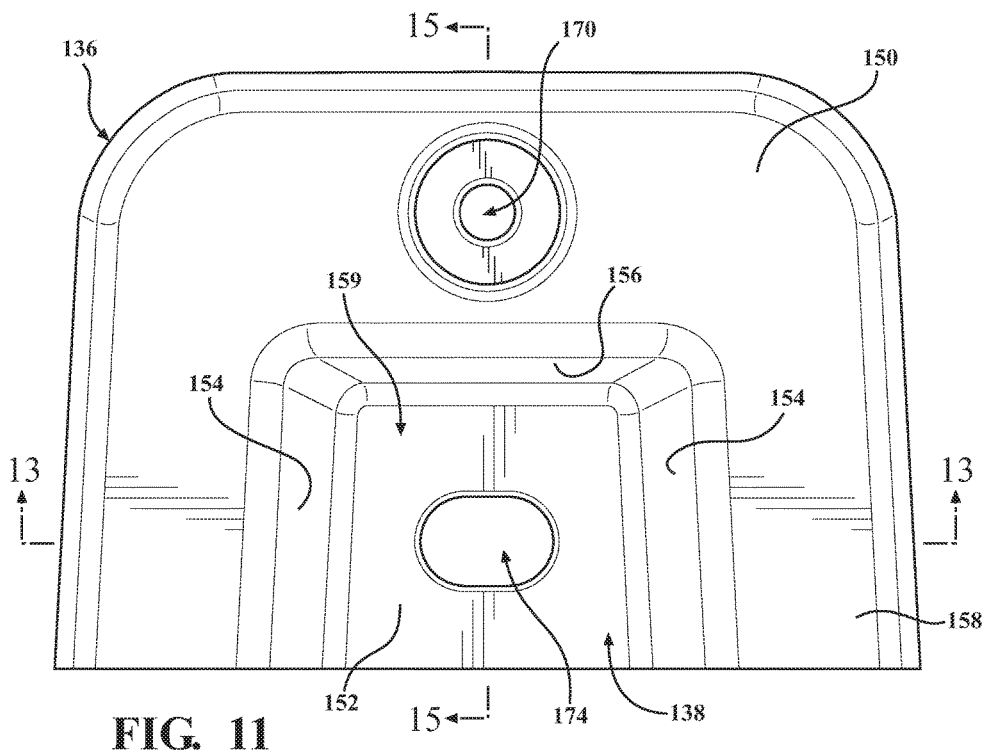
Figure 12:
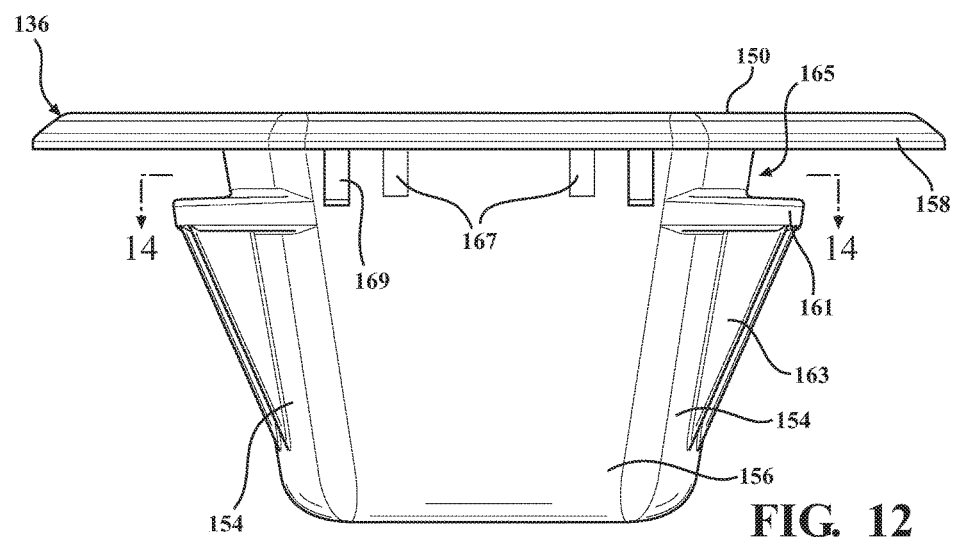

In one or more arrangements, the attachment member 36 provides two levels of attachment. The upper surface 50 engages with the top surface 30 of the grille 28 to provide a first level of attachment. The lower surface 52 engages with the radiator 32 to provide a second level of attachment. These first and second levels of attachment may be vertically spaced apart, as shown. The lower surface 52 may have an opening 74 that may align with an opening 76 in the radiator 32. A fastener 78 may be inserted in the aligned openings 74, 76 to attach the radiator 32 to the attachment member 36. The fastener 78 may take a variety of forms. By way of non-limiting example, the fastener 78 may be a threaded fastener, a push clip and grommet, etc. In FIG. 9, the fastener 78 includes a push pin 80 and a grommet 82. The grommet 82 may be inserted into the aligned openings 74, 76, and then the push pin 80 may be inserted through the grommet

82. The push pin 80 can, in turn, flare out wings 84 of the grommet 82 to secure the radiator 32 to the attachment member 36.

Referring now to FIGS. 10-15, a second exemplary attachment member 136 with a side opening 138 is shown. The attachment member 136 is configured to engage with a grille opening 40 having generally parallel sides 42. The attachment member 136 may have an upper surface 150 and a lower surface 152 spaced apart by three side walls. The three sidewalls may include a pair of generally parallel side walls 154 and a base side wall 156. The upper surface 150 extends outwardly beyond the side walls 154, 156 to form a flange 158. The side walls 154, 156 may be dimensioned to fit within the grille opening 40 such that the attachment member 136 may be inserted horizontally into the grille opening 40 from the side, with the flange 158 ultimately resting on the top surface 30. The flange 158 may provide vertical support for the attachment member 136 and a radiator 32 attached thereto. The base side wall 156 may engage with the base side 44 of the grille opening 40 to limit the degree to which the attachment member 136 may be inserted/slid into the grille opening 40. The upper and lower surfaces 150, 152, in conjunction with the side walls 154, 156, may form a generally cup-shaped attachment member 136 with an open top and the side opening 138, allowing access to an interior 159 of the attachment member 136.

In one or more arrangements, a flange 161 may extend along one or more of the side walls 154, below the flange 158. The flange 161 may extend horizontally outwardly, such as in a lateral or cross-car direction, from the side walls 154, and may be supported with buttresses 163. The flange 161 may be generally parallel with the flange 158, with a slot 165 formed therebetween, within which a portion of the grille 28 may be disposed. The flange 161 may engage with the bottom side 66 of the top surface 30 after installation. Engagement of the flange 161 with the bottom side 66 inhibits vertical movement of the attachment member 136 in the grille opening 40. In this manner, the flanges 158, 161 may vertically retain the attachment member 136 within the grille opening 40. The shape of the attachment member 136 relative to that of the grille opening 40 may also limit both fore and aft (longitudinal) and lateral (cross-vehicle) movement relative to the vehicle 20. The side walls 154 may engage with the sides 42 of the opening 40 to limit lateral movement, while the base side wall 156 may engage with the base side 44 to limit movement toward the base side 44.

A fastener 168 may be utilized to further retain the attachment member 136 within the grille opening 40. For example, the attachment member 136 may have an opening 170 in the upper surface 150, which may align with an opening 72 in the top surface 30. The fastener 168 may be inserted into the aligned openings 170, 72 to retain the attachment member 136 in the grille opening 40. The fastener 168 may function to limit fore and aft movement of the attachment member 136 relative to the grille opening 40. By way of non-limiting example, the fastener 168 may be a threaded fastener, a push clip and grommet, etc. In this manner, the attachment member 136 may be retained within the grille opening 40.

Figure 14:
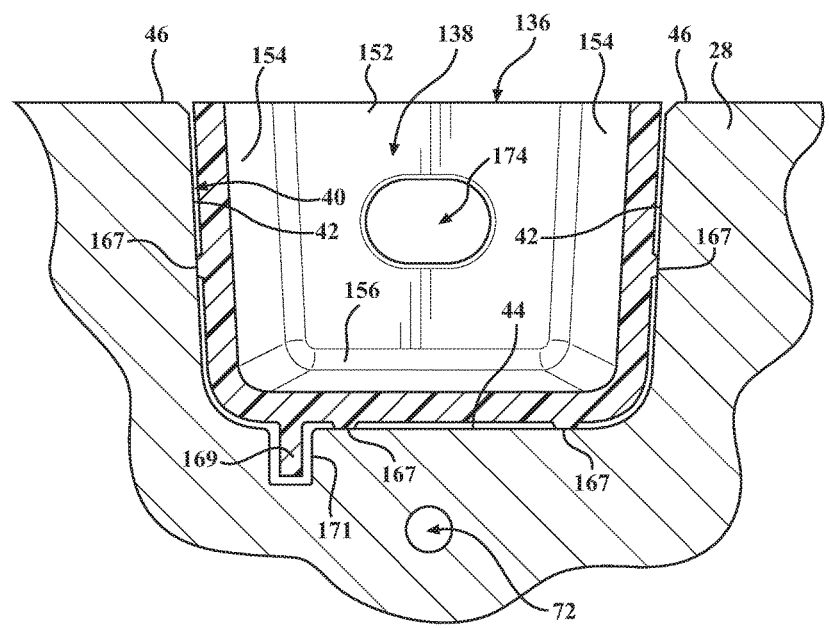
FIG. 14 is a cross-sectional view along line 14-14 of FIG. 12 illustrating the second exemplary attachment member installed in the grille.

In one or more arrangements, the attachment member 136 may include one or more vertical ribs 167 extending along an exterior of one or more of the side walls 154, 156 opposite the interior 159. The ribs 167 may engage with the sides 42, 44, as shown in FIG. 14, to provide a positive horizontal engagement between the attachment member 136 and the grille opening 40. The ribs 167 may assist with proper orientation of the attachment member 136 within the grille opening 40, and inhibit relative rotational motion therebetween along a vertical axis.

In one or more arrangements, the attachment member 136 may include an indexing feature 169, such as a rib, extending vertically along an exterior of the base side wall 156 opposite the interior 159. The indexing feature 169 may extend outwardly beyond any of the ribs 169 (if present), and may be complementary to an indexing feature 171, such as a recess, in the base side 44 of the grille opening 40. The indexing features 169, 171 may be used in situations where a particular attachment member 136 is to be used in a particular grille opening 40. For example, in one or more arrangements, a wiring harness or other feature (not shown) may be coupled to an attachment member 136 that, as a result, is associated with a particular grille opening 40 in the grille 28. In this manner, insertion of an attachment member 136 having an indexing feature 169 into a grille opening 40 not having a complementary indexing feature 171 will not allow for full insertion and retention, due to indexing feature 169 engaging with the base side 44 and preventing alignment of the openings 170, 72. Thus, indexing features 169, 171 may be utilized to prevent an attachment member 136 from being used in an inappropriate grille opening 40.

Figure 15:
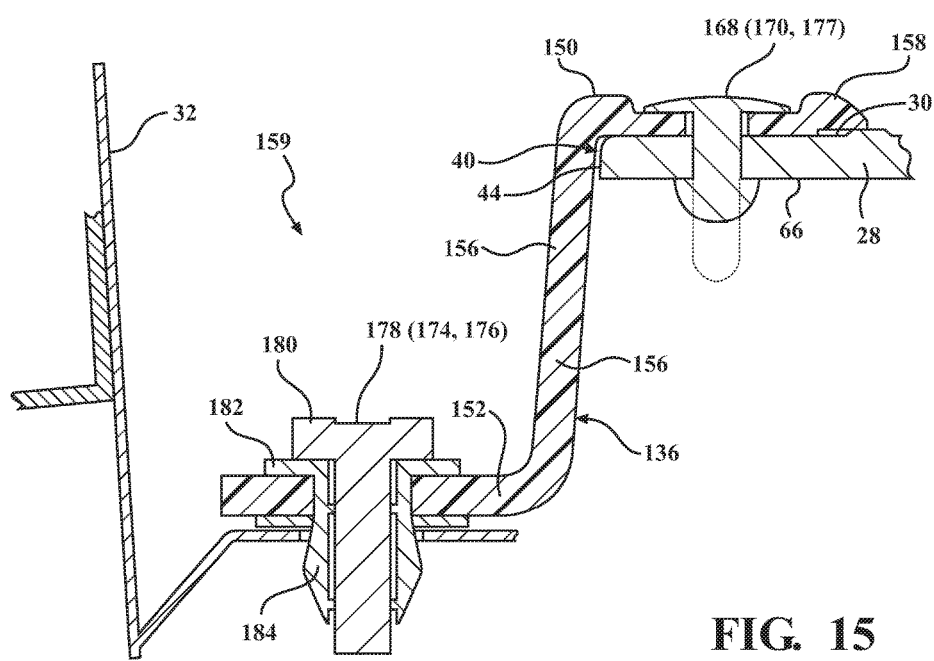
FIG. 15 is a cross-sectional view along line 15-15 of FIG. 11 illustrating the second exemplary attachment member installed in the grille and attached to the radiator.

In one or more arrangements, the attachment member 136 provides two levels of attachment. The upper surface 150 engages with the top surface 30 of the grille 28 to provide a first level of attachment. The lower surface 152 engages with the radiator 32 to provide a second level of attachment. These first and second levels of attachment may be vertically spaced apart, as shown. The lower surface 152 may have an opening 174 that may align with the opening 76 in the radiator 32. A fastener 178 may be inserted in the aligned openings 174, 76 to attach the radiator 32 to the attachment member 136. The fastener 178 may take a variety of forms. By way of non-limiting example, the fastener 178 may be a threaded fastener, a push clip and grommet, etc. In FIG. 15, the fastener 178 includes a push pin 180 and a grommet 182. The grommet 182 may be inserted into the aligned openings 174, 76, and then the push pin 180 may be inserted through the grommet 182. The push pin 180 can flare out wings 184 of the grommet 182 to secure the radiator 32 to the attachment member 136.

It will be appreciated that arrangements described herein can provide numerous benefits, including one or more of the benefits mentioned herein. For example, an attachment member 36, 136 may couple a radiator 32 to a grille 28 of an automotive vehicle 20. The attachment member 36, 136 may be easily fit into a complementary grille opening 40 on the grille 28. The complementary shapes of the attachment member 36, 136 and the grille opening 40 may limit movement of the attachment member 36, 136 relative to the grille 28 in one or more directions. The attachment member 36, 136 may install from above the grille opening 40 or horizontally slide into the grille opening 40. Engagement features on the attachment member 36, 136 may engage with surfaces of the grille opening 40 to limit relative vertical movement. The attachment member 36, 136 may provide a first engagement with the grille 28 at a first level and a second engagement with the radiator 32 at a second level different than the first level.

The terms related to orientation, such as vertical, horizontal, above, below, longitudinal, lateral, etc. are based on the relative orientation of the components as shown in the FIGS Figures. It should be appreciated that the components may be arranged in a different orientation and that the terms used herein are relative terms.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). The term "operatively connected" as used throughout this description, can include direct or indirect connections, including connections without direct physical contact.

Aspects herein can be embodied in other forms without departing from the spirit or essential attributes thereof. Accordingly, reference should be made to the following claims, rather than to the foregoing specification, as indicating the scope of the invention. It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. 112, sixth paragraph, unless and until such claim limitations expressly use the phrase "means for" followed by a statement of function void of further structure.

What is claimed is:

1. A system for attaching a grille to a radiator in an automotive vehicle, the system comprising:
   a grille having a grille opening along an edge thereof, the grille opening having a first shape;
   a radiator disposed behind at least a portion of the grille; and
   an attachment member having an exterior second shape, the second shape being generally complementary to the first shape such that the attachment member is adapted for disposition within the grille opening with the second shape in close proximity to the first shape, the attachment member having a first attachment to the grille at a first level and a second attachment to the radiator at a second level, the first level being spaced apart from the second level, and the first and second attachments adapted to couple the radiator to the grille through the attachment member.

2. The system of claim 1, wherein the grille opening is generally U-shaped and includes a base side and a pair of tapering sides extending from opposite ends of the base side, the tapering sides taper towards one another as the tapering sides extend away from the base side, and the attachment member is insertable into the grille opening from above the grille opening.

3. The system of claim 2, wherein the attachment member includes a base side wall and a pair of tapering side walls extending from opposite ends of the base side wall.

4. The system of claim 3, wherein the tapering side walls are adapted to engage with the tapering sides and prevent the attachment member from being horizontally removed from the grille opening.

5. The system of claim 3, wherein the attachment member includes a resilient clip on at least one of the tapering side walls, the clip having a ramped surface adapted to engage the grille during insertion and a locking flange adapted to engage a surface of the grille after insertion, the engagement of the locking flange adapted to inhibit removal of the attachment member from the grille opening after insertion.

6. The system of claim 1, wherein the grille opening is generally U-shaped and includes a base side and a pair of generally parallel sides extending from opposite ends of the base side, and the attachment member is insertable into the grille opening by sliding the attachment member into the grille opening.

7. The system of claim 6, wherein the attachment member includes a base side wall and a pair of generally parallel side walls extending from opposite ends of the base side wall, an upper flange and a lower flange extending outwardly from the side walls below the upper flange, the upper and lower flanges forming a slot, and a portion of the grille is disposed in the slot when the attachment member is inserted into the grille opening.

8. The system of claim 7, wherein the first grille opening and the attachment member include complementary indexing features adapted to engage with one another when the attachment member is inserted into the grille opening.

9. The system of claim 7, wherein the attachment member includes at least one rib extending along at least one of the base side wall and the parallel side wall, the at least one rib adapted to contact the grille opening when the attachment member is inserted into the grille opening.

10. The system of claim 1, wherein the first attachment is above the second attachment.

11. A system for attaching a grille to a radiator in an automotive vehicle, the system comprising:
   a grille having a grille opening along an edge thereof, the grille opening having a first shape;
   a radiator disposed behind at least a portion of the grille; and
   an attachment member having an exterior second shape, the second shape being generally complementary to the first shape such that the attachment member is adapted for disposition within the grille opening with the second shape in close proximity to the first shape, the attachment member adapted to couple the radiator to the grille, wherein the attachment member is insertable into the grille opening from above the grille opening.

12. The system of claim 11, wherein the grille opening is generally U-shaped and includes a base side and a pair of tapering sides extending from opposite ends of the base side.

13. The system of claim 12, wherein the tapering sides taper towards one another as the tapering sides extend away from the base side.

14. The system of claim 13, wherein the attachment member includes a base side wall and a pair of tapering side walls extending from opposite ends of the base side wall.

15. The system of claim 14, wherein the tapering side walls engage with the tapering sides and prevent the attachment member from being horizontally removed from the grille opening.

16. A system for attaching a grille to a radiator in an automotive vehicle, the system comprising:
a grille having a grille opening along an edge thereof, the grille opening having a first shape;
a radiator disposed behind at least a portion of the grille; and
an attachment member having an exterior second shape, the second shape being generally complementary to the first shape such that the attachment member is adapted for disposition within the grille opening with the second shape in close proximity to the first shape, the attachment member having a first attachment to the grille at a first level and a second attachment to the radiator at a second level, the first level being spaced apart from the second level, and the first and second attachments adapted to couple the radiator to the grille through the attachment member, wherein the attachment member is insertable into the grille opening by sliding the attachment member into the grille opening.

17. The system of claim 16, wherein the grille opening is generally U-shaped and includes a base side and a pair of generally parallel sides extending from opposite ends of the base side.

18. The system of claim 17, wherein the attachment member includes a base side wall and a pair of generally parallel side walls extending from opposite ends of the base side wall, an upper flange and a lower flange extending outwardly from the side walls below the upper flange, the upper and lower flanges forming a slot, and a portion of the grille is disposed in the slot when the attachment member is inserted into the grille opening.

19. The system of claim 18, wherein the grille opening and the attachment member include complementary indexing features adapted to engage with one another when the attachment member is inserted into the grille opening.

20. The system of claim 18, wherein the attachment member includes at least one rib extending along at least one of the base side wall and the parallel side wall, and the at least one rib is adapted to contact the grille opening when the attachment member is inserted into the grille opening.

* * * * *

UNITED STATES PATENT AND TRADEMARK OFFICE
CERTIFICATE OF CORRECTION

PATENT NO. : 10,220,805 B2
APPLICATION NO. : 15/664744
DATED : March 5, 2019
INVENTOR(S) : Mingher Fred Shen et al.

Page 1 of 1

It is certified that error appears in the above-identified patent and that said Letters Patent is hereby corrected as shown below:

In the Specification

Column 4, Line 27: replace "the opening" with --the grille opening--
Column 5, Line 44: replace "the opening" with --the grille opening--
Column 8, Line 34: replace "the first grille opening" with --the grille opening--

Signed and Sealed this
Twelfth Day of November, 2019

Andrei Iancu
*Director of the United States Patent and Trademark Office*